Oct. 20, 1936.   P. F. WENDEL ET AL   2,058,117
AUTOMOBILE DELIVERY BODY STRUCTURE
Filed Sept. 22, 1933   4 Sheets-Sheet 2
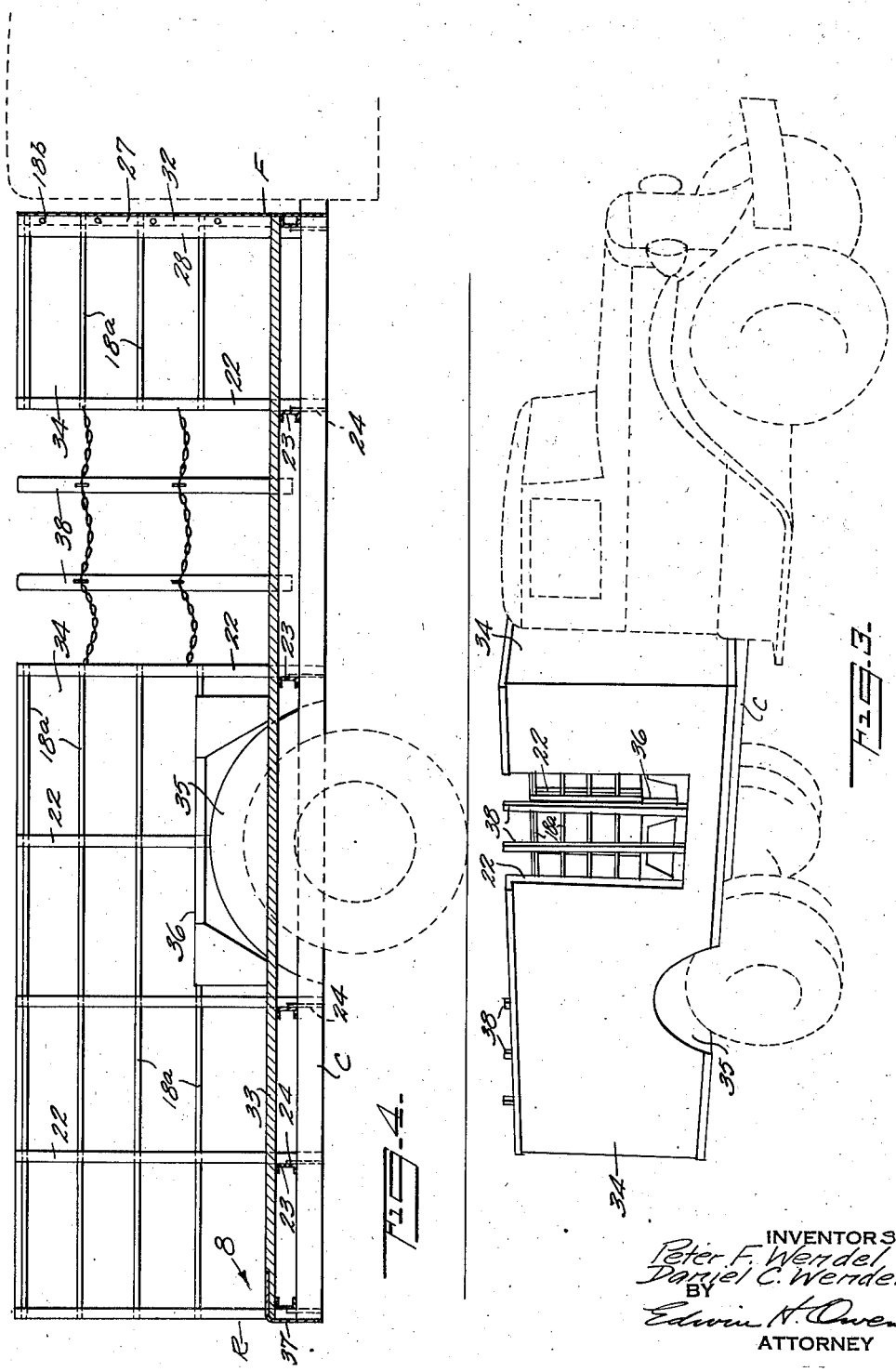
INVENTORS
Peter F. Wendel
Daniel C. Wendel
BY
Edwin H. Owen
ATTORNEY

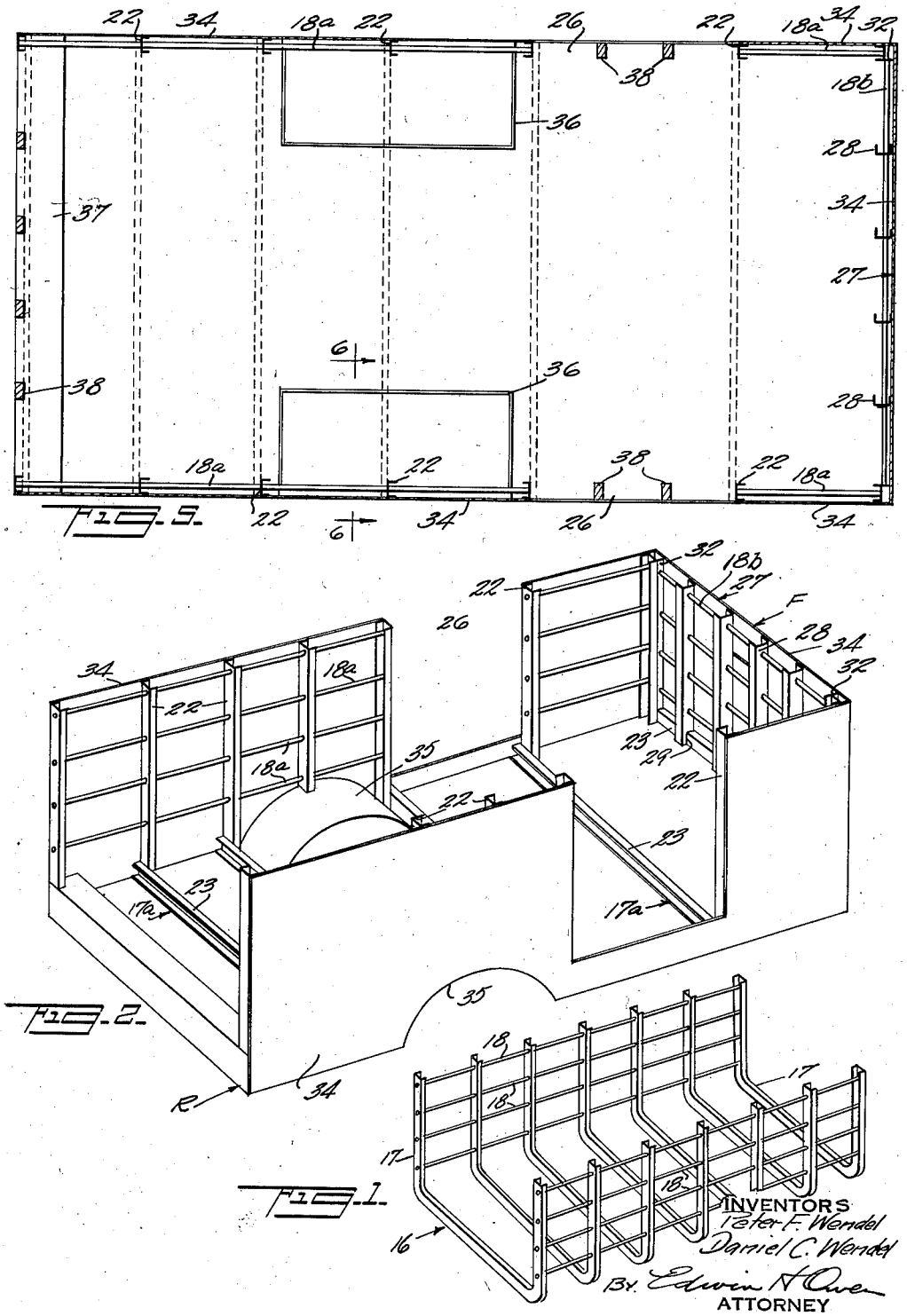

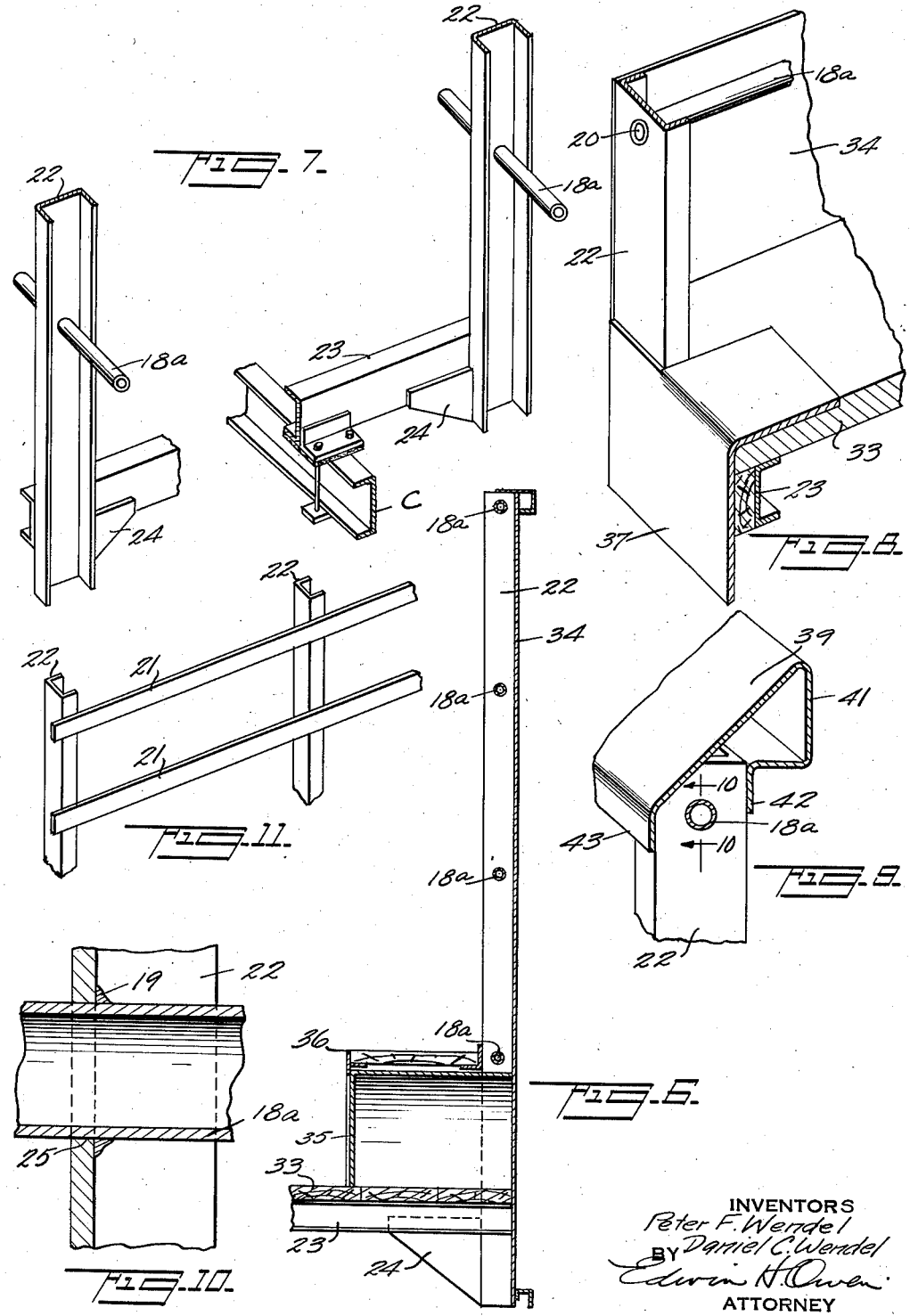

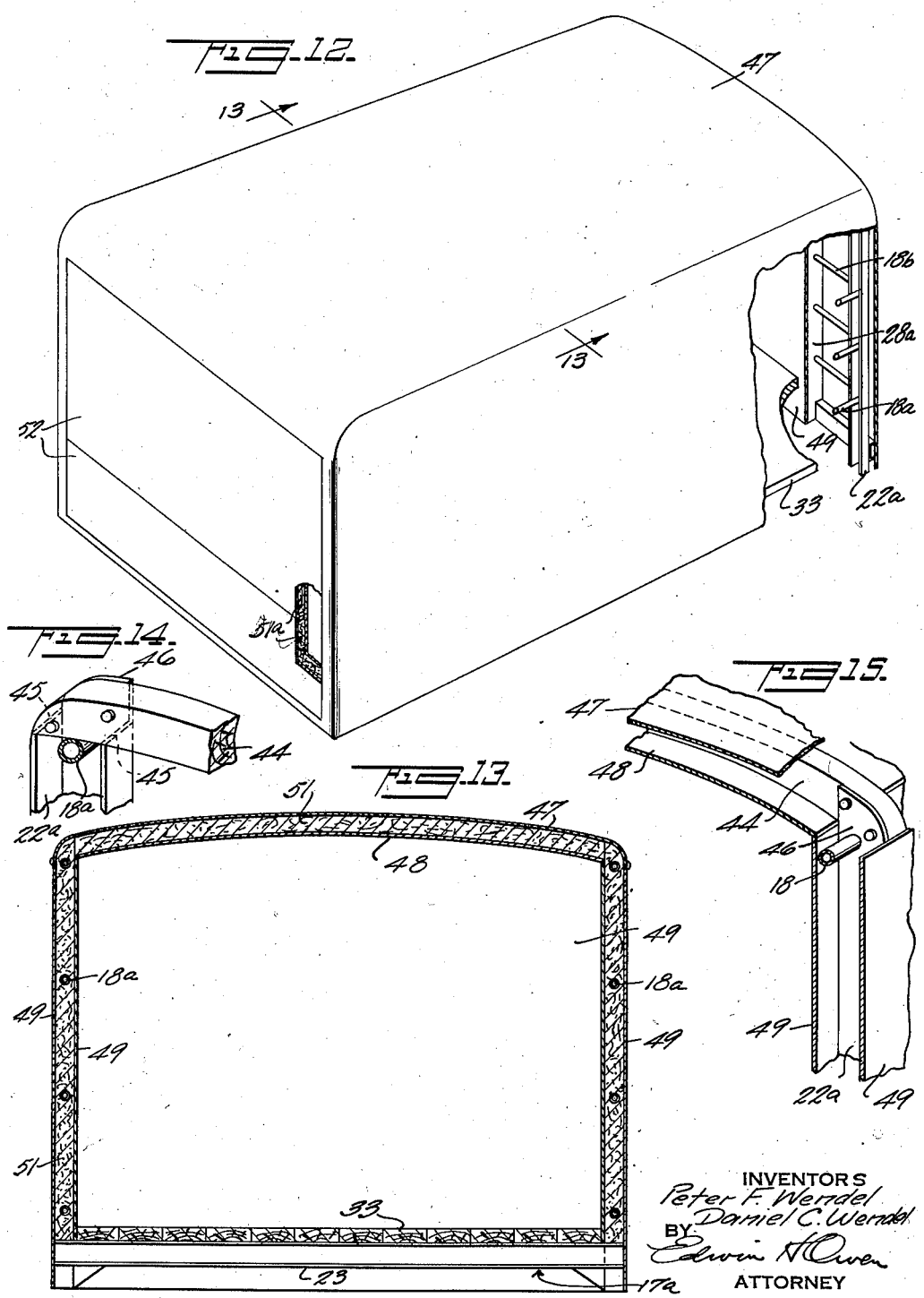

Patented Oct. 20, 1936

2,058,117

UNITED STATES PATENT OFFICE 2,058,117

AUTOMOBILE DELIVERY BODY STRUCTURE

Peter F. Wendel, Morristown, and Daniel C. Wendel, Newark, N. J.

Application September 22, 1933, Serial No. 690,590

2 Claims. (Cl. 296—28)

This invention relates to a vehicle body structure for open and closed bodies which are particularly constructed for use on commercial automobile chassis.

It has been the practice to construct the frame work in bodies for commercial vehicles of wood with bracing members of metal, which practice required considerable time and was therefore expensive.

According to this invention the frame work of the body structure is principally constructed of metal and is so arranged as to provide a skeleton structure, comprised of a number of substantially U shaped ribs adapted to form the side walls and bottom of the body frame and connecting said ribs together in a spaced relation by means of metal tubing, straps or the like which may be welded, bolted or secured thereto in any suitable manner, welding, however being preferred. A very rigid frame structure is thus provided which can be assembled quickly and although being made of metal, will actually weigh less when completed, with its end wall outside covering and floor, than a body of equal size constructed of wood.

The frame structure is also adapted to support a roof on the side portions of the U shaped members, and when supplied with suitable back door members will provide a completely closed body.

A further improvement comprises an insulated wall and roof structure in a closed type of body which is easily accomplished by filling an insulating material between plates or cover means provided at each side of the wall structure and between similar covering means at each side of the roof supporting beams.

Another feature comprises the adaptability of this type of frame structure to provide a standard sectional body for open type vehicles in which two side delivery openings are provided, said sections being adapted to be mounted on varying lengths of chassis frames without changing the body, any variation in the length being taken up in the side openings.

With the above and other objects not specifically referred to in view, the invention consists in certain novel parts, arrangements, and combinations which will be more fully described in connection with the accompanying drawings and the novel features pointed out in the claims hereunto annexed.

In the drawings:

Fig. 1 is a perspective view showing the skeleton U shaped frame structure.

Fig. 2 is an enlarged perspective showing the skeleton structure of Fig. 1 applied to an open vehicle job of the sectional type, having side openings.

Fig. 3 is a perspective view showing a body of the type shown in Fig. 2 completely assembled on an automobile chassis.

Fig. 4 is a longitudinal section taken through the body shown in Fig. 3.

Fig. 5 is a plan view of the body shown in Fig. 3.

Fig. 6 is a section through one side wall and wheel housing taken along the lines 6—6 of Fig. 5.

Fig. 7 is a detail perspective on an enlarged scale of the lower portion of a U shaped frame member and a means for mounting same on a chassis frame.

Fig. 8 is a perspective of the lower rear corner looking in the direction of the arrow 8 of Fig. 4.

Fig. 9 is a section detail view of a flared attachment which is adapted to be secured to the top of the U shaped members.

Fig. 10 is an enlarged sectional view taken along the lines 10—10 of Fig. 9 showing a method of welding the tubular members to the side channels.

Fig. 11 is a perspective detail view of a modified structure in which straps are secured to the side channels of the U shaped members.

Fig. 12 is a perspective view of a closed body structure with parts broken away.

Fig. 13 is a cross section taken through Fig. 12 on the lines 13—13.

Fig. 14 is a perspective detail on an enlarged scale showing a method of securing the roof supporting beams to the side channels of the U shaped members, and Fig. 15 is a perspective detail showing a portion of the roof and side wall structure with covering plates secured thereto.

Referring to the drawings, in which like reference characters indicate like parts, the reference character 16 generally indicates a skeleton frame structure as best shown in Fig. 1 which comprises a plurality of substantially U shaped transverse ribs 17, which ribs are adapted to be joined together in a spaced relation in any suitable manner as for example by uniting or securing to the vertically disposed sides of said U shaped ribs, several longitudinal tie rods or tubular members 18. Said tubular members will preferably pass through openings in the side portions and are adapted to be welded thereto in a manner to be described. Another method of securing the ribs together is shown in Fig. 11 in which straps 21 are secured to said portions by means of welding or any other suitable manner.

A strong skeleton frame structure is thus provided upon which the remainder of the body structure for an automobile truck body can be built and due to the simplicity of the frame structure the parts can be assembled very quickly. While the broad principle of the skeleton structure is shown in Fig. 1, various forms of frame structure can be erected upon this principle of construction to suit the requirements of all types of truck bodies, including both the open and closed types, both of which types are illustrated in the drawings.

Referring to Figs. 2 to 9 inclusive a special form of open body truck is shown which is provided with side and rear loading and delivery openings. The frame of said structure comprises a number of substantially U shaped transverse ribs generally indicated at 17a, which are joined by welding longitudinal tubular members 18a thereto. Each U shaped rib in this structure is shown as constructed of three pieces of channel, two vertically disposed side channels 22—22 and a bottom cross member 23 which are preferably joined together by welding and may be provided with reinforcing gussets 24, as indicated in Fig. 7. The tubular members 18a pass through openings 25 in each of the side channels 22—22 and are welded to the inside of said channels and shown at 19 (Fig. 10). Plugs 20 will be inserted in the outside ends of the tubular members as indicated in Fig. 8, and then will be ground smooth with the face of the channel web.

To provide for side openings 26—26, the frame structure is divided into two sections a front section, indicated at F and a rear section, indicated at R, each of which sections are mounted on a chassis frame C (Figs. 4 and 7) in a spaced relation. The front section F has a front wall frame 27 combined therewith which comprises several vertically disposed uprights 28, notched at the bottom 29 to engage one of the bottom cross channels 23 and having openings in which tubular members 18b are inserted and welded to the said uprights 28 and to flange members 32, projecting from the side channels 22—22 of the end U shaped rib structure.

The skeleton frame structure is further reinforced by means of the flooring which preferably comprises planks 33 resting upon and secured to the bottom cross members 23 (Fig. 4) and also by the side plates 34, which are secured to the vertically disposed side channels 22 and the front uprights 28. Said side plates may comprise any suitable material such as metal plates, fiber or composition wood panels and the like. If metal plates are used, they will be spot welded directly to the side channels 22. An additional reinforcing means is provided at the end of the floor portion which comprises a heavy plate member 37 formed to a right angle shape and assembled as indicated in Fig. 8 to form a wear plate and rear apron.

When the width of the body extends over the wheels on the chassis and the floor is placed below the top of the wheels, a housing is provided as indicated at 35 and a protecting member is built around said housing, as indicated at 36 to protect same and to provide a platform on which articles may be placed.

It is to be particularly noted that a truck body constructed according to the method as described is practically an all metal job which if desired can be almost wholly joined together by welding thus providing a most rigid structure which will withstand greater abuse than a truck constructed of wood and will easily outwear the chassis. When the parts are secured by the process of welding, the welds will be made at the most suitable places in the frame structure.

In order to prevent the load from falling from the side and rear openings of the type of body shown in Figs. 3, 4, and 5, it is desirable to provide same with protecting posts 38.

A flare plate may also be provided on the open body job such as illustrated in Fig. 9, which plate comprises a metal sheet formed with one angularly disposed side 39, and having a vertical outside wall 41 which is bent inward and downward to form a flange 42. Another flange 43 is formed at the lower end of the angular side 39 which, with the flange 42 forms a means for attaching the flare plate to the side channels 22 by either welding or bolting same thereto.

While the previously described structure is particularly applicable to an open body job, it is to be understood that the same frame structure can also be used in a closed body job, such as shown in Figs. 12 to 15. In said structure the frame assembly will be the same as that illustrated in Fig. 2, excepting that the tubular members 18b will continue throughout the length of each side and thereby eliminate the side openings.

The roof structure will comprise bracing beams 44 which are adapted to be supported upon the upper ends 45 of the side channels 22a and are secured to a web extension 46 by bolts, or in any other convenient manner. By placing outside roof covering 47 outside of the beams 44 and an inside covering 48 along the inside of the beams and padding same with some suitable material such as insulating material, a very substantial roof structure can be constructed.

It is also possible to provide an insulated wall structure for the side walls and end wall of this type of job, by including wall plates 49—49 along the outside and inside of the side channels 22a and front uprights 28a. Insulating material 51 is placed between the side and front wall plates and also between the roof coverings to make a completely insulated body. Suitable doors 52 are provided at the rear for loading and delivery openings, which doors may also be provided with insulation as indicated at 51a if desired.

Having described the invention, we claim:

1. A vehicle body comprising a plurality of transverse frame sections spaced one from another, each frame section including a horizontally disposed channel shaped member and a vertically disposed channel shaped member connected adjacent each end thereof, the web portions of each of said members extending in planes normal to the longitudinal axis of the vehicle body and the flange portions of each of said members extending in planes parallel to the longitudinal axis of said vehicle body, vertically disposed channel shaped members mounted on the horizontally disposed channel shaped member located at the front of said vehicle body, each of said last named channel shaped members having the webs thereof disposed in planes parallel with the longitudinal axis of the vehicle body, and the flange portions thereof arranged in planes normal to the longitudinal axis of the vehicle body, and tie rods extending through the web portions of each of the vertically disposed channel shaped members, 2. Vehicle body structure as set forth in claim 1 and including an additional flange portion on each of the vertically disposed channel shaped members connected adjacent the ends of the horizontally disposed channel shaped member at the front of said vehicle body; said additional flange portions being spaced with respect to the web portions of the vertically disposed channel shaped members mounted on the above said horizontally disposed member, and adapted to receive tie rods extending through said web portions.

PETER F. WENDEL.
DANIEL C. WENDEL.